(12) United States Patent
Yamasaki et al.

(10) Patent No.: US 11,987,169 B2
(45) Date of Patent: *May 21, 2024

(54) OPTICAL AXIS ADJUSTMENT DEVICE

(71) Applicant: SUBARU CORPORATION, Tokyo (JP)

(72) Inventors: Kentarou Yamasaki, Tokyo (JP); Noriaki Asano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,522

(22) Filed: Sep. 19, 2022

(65) Prior Publication Data

US 2023/0102156 A1    Mar. 30, 2023

(30) Foreign Application Priority Data

Sep. 29, 2021 (JP) ................. 2021-159759

(51) Int. Cl.
*B60Q 1/06* (2006.01)
*B60Q 1/08* (2006.01)

(52) U.S. Cl.
CPC ............... *B60Q 1/06* (2013.01); *B60Q 1/08* (2013.01); *B60Q 2300/05* (2013.01)

(58) Field of Classification Search
CPC ........ B60Q 1/06; B60Q 1/0683; B60Q 1/076; B60Q 1/08; B60Q 1/085; B60Q 1/10; B60Q 1/14
See application file for complete search history.

(56) References Cited

U.S. PATENT DOCUMENTS 6,161,950 A * 12/2000 Tsukamoto ............ B60Q 1/076
                                                                  362/284
2018/0065539 A1* 3/2018 Ohsawa ................. B60Q 1/085

FOREIGN PATENT DOCUMENTS

DE     102009035564 A1 *  2/2011  ........... B60Q 1/0408
JP     2009-234456 A     10/2009

OTHER PUBLICATIONS

Machine translation of DE-102009035564-A1, retrieved from worldwide.espacenet.com. (Year: 2011).*
U.S. Appl. No. 17/947,476, filed Sep. 22, 2022 (Year: 2022).*

* cited by examiner

*Primary Examiner* — Jia X Pan
*Assistant Examiner* — Steven Y Horikoshi
(74) *Attorney, Agent, or Firm* — Rimon P.C.

(57) ABSTRACT

Provided is an optical axis adjustment device for a vehicle headlamp. The optical axis adjustment device adjusts an optical axis of a headlamp unit to be mounted in a vehicle, and the optical axis adjustment device includes: an engine temperature acquirer; a displacement amount calculator; a speed information acquirer; and an optical axis adjuster. The engine temperature acquirer acquires a temperature in an engine compartment of the vehicle. The displacement amount calculator calculates a displacement amount of the optical axis based on the acquired temperature. The speed information acquirer acquires speed information including a travel speed and a travel time of the vehicle. The optical axis adjuster adjusts the optical axis of the headlamp unit on a basis of the calculated displacement amount and the acquired speed information.

5 Claims, 5 Drawing Sheets

OPTICAL AXIS ADJUSTMENT DEVICE

CROSS-REFERENCE TO RELATED APPLICATIONS

The present application claims priority from Japanese Patent Application No. 2021-159759 filed on Sep. 29, 2021, the entire contents of which are hereby incorporated by reference.

BACKGROUND

The disclosure relates to an optical axis adjustment device configured to adjust an optical axis of a vehicle headlamp to be installed in a vehicle.

A vehicle headlamp is adjusted so that an optical axis thereof is positioned within a range defined by laws and regulations. A known example of an optical axis adjustment device that adjusts an optical axis of a vehicle headlamp is an automatic leveling device. The automatic leveling device is configured to adjust, when an angle of a vehicle body in a front-rear direction is inclined with respect to a horizontal direction, the optical axis of the vehicle headlamp according to the inclination angle (Japanese Unexamined Patent Application Publication (JP-A) No. 2009-234456).

SUMMARY

An aspect of the disclosure provides an optical axis adjustment device for a headlamp unit to be mounted in a vehicle. The optical axis adjustment device is configured to adjust an optical axis of the headlamp unit. The optical axis adjustment device includes an engine temperature acquirer, a displacement amount calculator, a speed information acquirer, and an optical axis adjuster. The engine temperature acquirer is configured to acquire a temperature in an engine compartment of the vehicle. The displacement amount calculator is configured to calculate a displacement amount of the optical axi on a basis of the temperature. The speed information acquirer is configured to acquire speed information including a travel speed and a travel time of the vehicle. The optical axis adjuster is configured to adjust the optical axis of the headlamp unit on a basis of the displacement amount and the speed information.

An aspect of the disclosure provides an optical axis adjustment device for a headlamp unit to be mounted in a vehicle. The optical axis adjustment device is configured to adjust an optical axis of a headlamp unit. The optical axis adjustment device includes circuitry. The circuitry is configured to acquire a temperature in an engine compartment of the vehicle. The circuitry is configured to calculate a displacement amount of the optical axis on a basis of the temperature. The circuitry is configured to acquire speed information including a travel speed and a travel time of the vehicle. The circuitry is configured to adjust the optical axis of the headlamp unit on a basis of the displacement amount and the speed information.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

During vehicle travel, the ambient or internal temperature of a vehicle headlamp changes depending on the surrounding environment and travel conditions of the vehicle, and such a temperature change may cause a shift in the optical axis of the vehicle headlamp. In one example, the temperature change may cause a housing of the vehicle headlamp to thermally expand, and the vehicle headlamp itself may shift with respect to a vehicle body. In another example, the temperature change may cause a light source unit accommodated inside the housing of the vehicle headlamp to thermally expand, and the light source unit may shift with respect to the housing. Such a shift may cause the optical axis of the vehicle headlamp to deviate from a predetermined range.

However, the automatic leveling device of JP-A No. 2009-234456 described above is not designed to adjust a shift in the optical axis caused by a temperature change.

In recent years, as light sources (light-emitting diodes (LEDs)) used in vehicle headlamps have become higher in definition and the use of high-performance vehicle headlamps, such as adaptive driving beam (ADB) headlamps, has become widespread, higher-precision optical axis adjustment has become desirable.

This disclosure addresses such a situation. In other words, it is desirable to calculate and adjust a shift in an optical axis caused by temperature changes around a vehicle headlamp, and the like.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
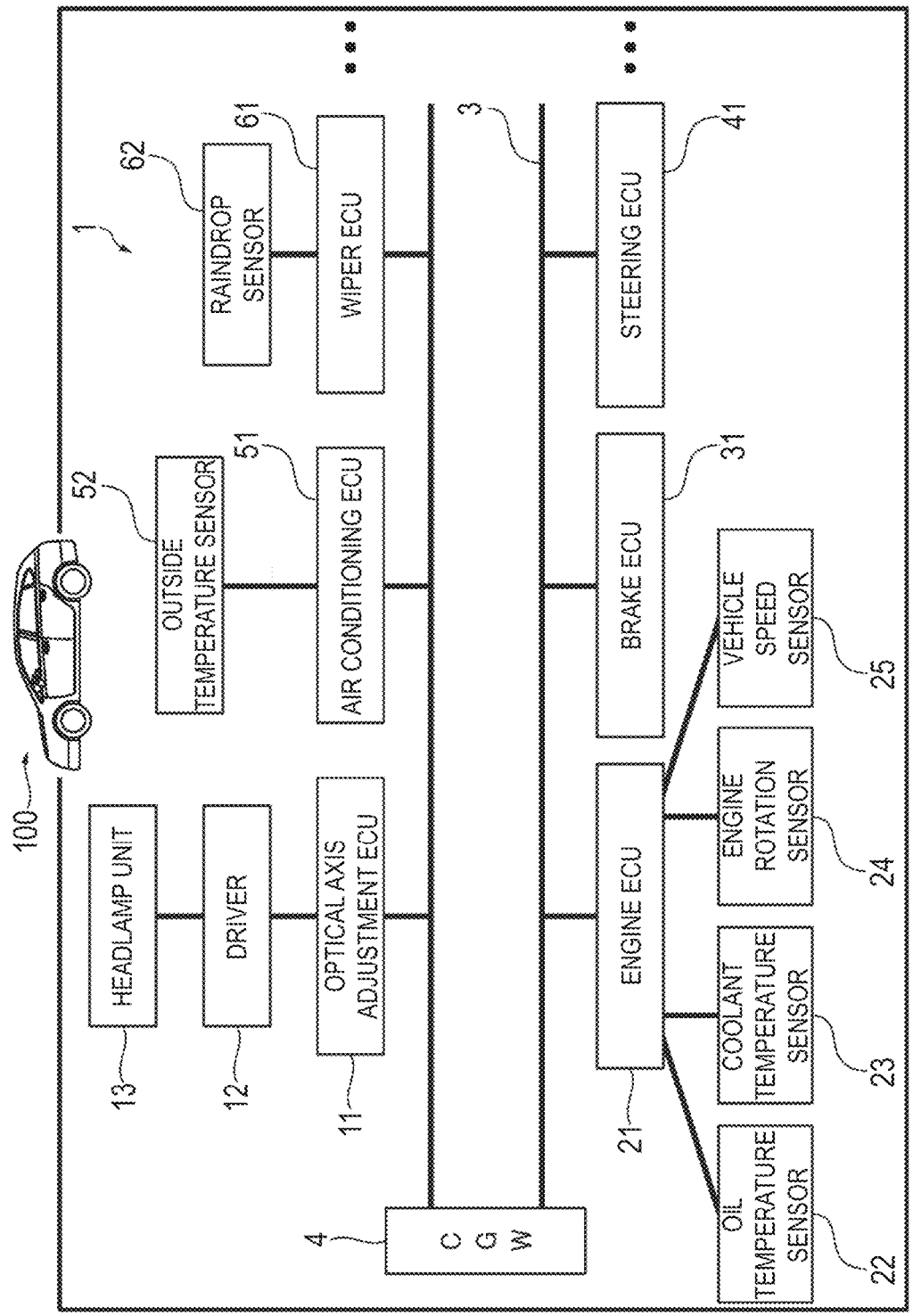
FIG. 1 is a schematic block diagram of a vehicle control system including an optical axis adjustment device according to an embodiment of the disclosure.

As illustrated in FIG. 1, an optical axis adjustment device to be mounted in a vehicle according to the embodiment of the disclosure may serve as part of a vehicle control system 1 and is provided in a vehicle 100. The vehicle control system 1 includes various electronic devices used for the travel of the vehicle 100, as well as in-vehicle electronic control units (ECUs) configured to control these electronic devices. Each electronic device, each in-vehicle ECU, and the like are communicably coupled to one another by an in-vehicle network 3, such as a controller area network (CAN) or a local interconnect network (LIN). Further, each electronic device, each in-vehicle ECU, and the like are coupled to a central gateway (CGW) 4 serving as a relay device, and thus constitute the vehicle control system 1.

Each in-vehicle ECU can include, for example, a processor such as a central processing unit (CPU) or a micro processing unit (MPU), electrical circuitry, and a storage element such as a random access memory (RAM) or a read only memory (ROM). Further, operations executed by the in-vehicle ECUs can be fully or partially realized by hardware such as an application specific integrated circuit (ASIC), a field-programmable gate array (FPGA), or a graphics processing unit (GPU).

In the following description, detailed descriptions and illustrations of electronic devices and the like not directly related to the optical axis adjustment device (an optical axis adjustment ECU 11) according to the present embodiment will be omitted.

As illustrated in FIG. 1, the vehicle control system 1 includes, as the in-vehicle ECUs, the optical axis adjustment ECU 11, an engine ECU 21, a brake ECU 31, a steering ECU 41, an air conditioning ECU 51, and a wiper ECU 61. Each in-vehicle ECU is coupled to an electronic device controlled by the in-vehicle ECU, and controls operation of the coupled electronic device on the basis of information (data) acquired from the in-vehicle network 3. Further, each in-vehicle ECU outputs information indicating a status, such as an operating status of the coupled electronic device, to the in-vehicle network 3.

The optical axis adjustment ECU 11 is coupled to a headlamp unit 13 provided in a front portion of the vehicle and a driver 12 configured to drive the headlamp unit 13. Further, the optical axis adjustment ECU 11 functions as an optical axis adjustment device configured to adjust an optical axis of the headlamp unit 13. Details of the optical axis adjustment ECU 11 will be described below.

The engine ECU 21, the brake ECU 31, and the steering ECU 41 are respectively coupled to an engine, brakes, and a steering wheel. The engine ECU 21, the brake ECU 31, and the steering ECU 41 control the travel of the vehicle on the basis of the information acquired from the in-vehicle network 3.

In particular, the engine ECU 21 is coupled to an oil temperature sensor 22, a coolant temperature sensor 23, an engine rotation sensor 24, and a vehicle speed sensor 25. The oil temperature sensor 22 detects an oil temperature of the engine during travel and outputs the oil temperature to the engine ECU 21. The coolant temperature sensor 23 detects a coolant temperature of the engine during travel and outputs the coolant temperature to the engine ECU 21. The engine rotation sensor 24 detects a rotation speed of the engine from an ignition pulse, for example, and outputs the rotation speed to the engine ECU 21. The vehicle speed sensor 25 detects a travel speed of the vehicle and outputs the travel speed to the engine ECU 21.

In addition, the engine ECU 21, the brake ECU 31, and the steering ECU 41 acquire, from electronic devices respectively coupled thereto, status information (for example, information related to torque, accelerator pedal position, vehicle travel speed and travel time, fuel consumption, depressed amount of foot brake, on/off state of parking brake, or steering angle and steering amount of steering wheel) indicating a status of the electronic device, and output the acquired information to the in-vehicle network 3.

The air conditioning ECU 51 is coupled to an outside temperature sensor 52 attached to a vehicle exterior. The air conditioning ECU 51 controls an air conditioning unit (not illustrated) on the basis of an outside temperature acquired from the outside temperature sensor 52 and information acquired from the in-vehicle network 3. That is, while referencing the outside temperature acquired from the outside temperature sensor 52, the air conditioning ECU 51 controls the air conditioning unit so that a temperature inside the vehicle is a desired temperature set by a user.

The wiper ECU 61 is, for example, coupled to a raindrop sensor 62 that detects rainfall by a raindrop amount deposited on a windshield, and operates a wiper at predetermined intervals according to the raindrop amount acquired from the raindrop sensor 62. Alternatively, the wiper ECU 61 operates the wiper according to information based on an operation by an occupant of the vehicle. The information is acquired via the in-vehicle network 3.

Optical Axis Adjustment Device

In the following, the optical axis adjustment ECU 11 s will be described. The optical axis adjustment ECU 11 controls the driver 12 with reference to the information acquired from each in-vehicle ECU described above via the in-vehicle network 3. On the basis of such control, the optical axis adjustment ECU 11 adjusts an optical axis of light emitted from the headlamp unit 13, positioning the optical axis within a predetermined range. In one embodiment, the optical axis adjustment ECU 11 may serve as an "optical axis adjustment device".

Figure 2:
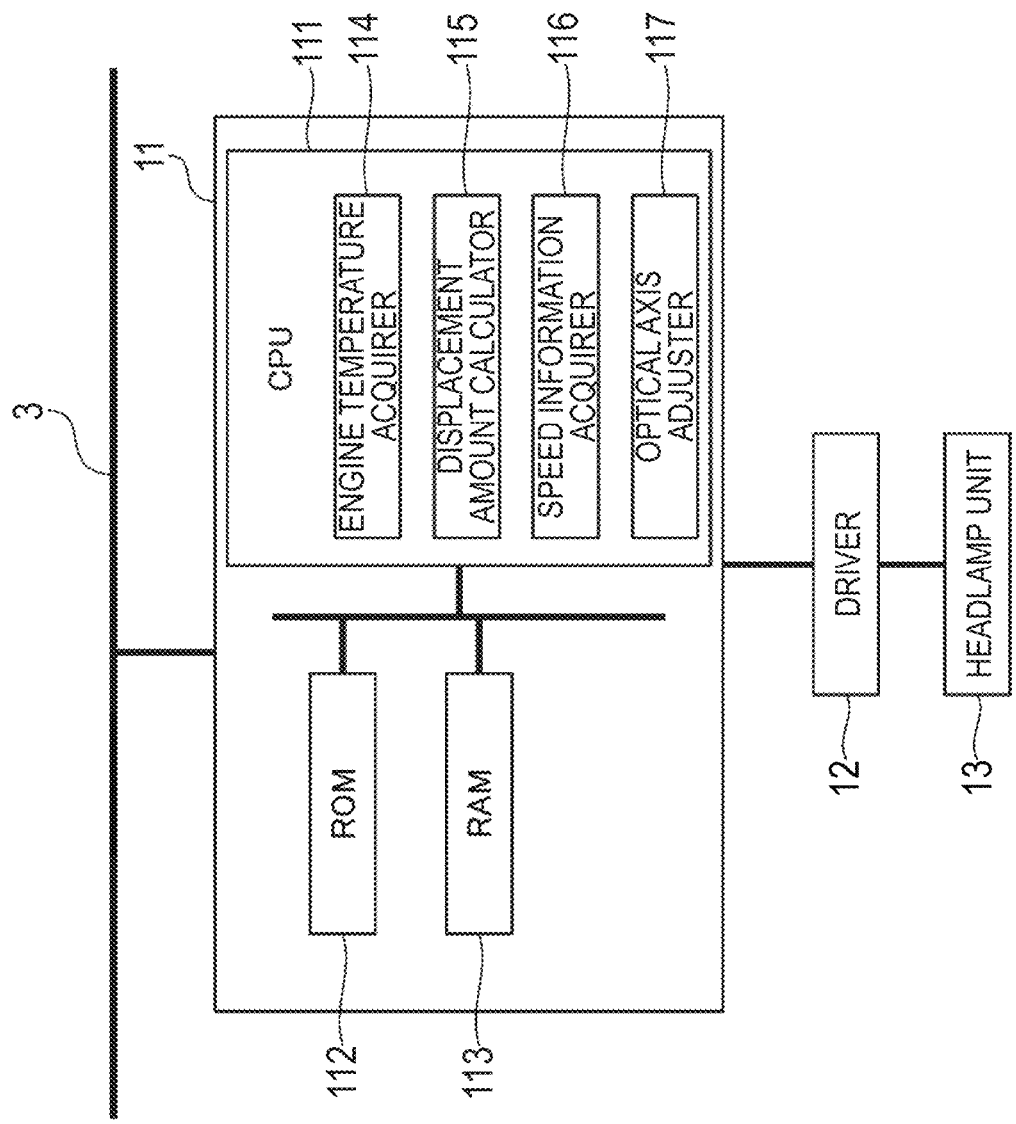
FIG. 2 is a schematic block diagram of the optical axis adjustment device according to the embodiment of the disclosure.

As illustrated in FIG. 2, the optical axis adjustment ECU 11 includes a CPU 111, a ROM 112, and a RAM 113.

The CPU 111 executes various processes on the basis of a program stored in the ROM 112. In the present embodiment, the CPU 111 loads the program stored in the ROM 112 into a memory such as the RAM 113, and executes the program. As a result, the CPU 111 may serve as an engine temperature acquirer 114, a displacement amount calculator 115, a speed information acquirer 116, and an optical axis adjuster 117 illustrated in FIG. 2. In the following, the engine temperature acquirer 114, the displacement amount calculator 115, the speed information acquirer 116, and the optical axis adjuster 117 will be described.

The engine temperature acquirer 114 acquires, via the engine ECU 21 and the in-vehicle network 3, the oil temperature of the engine detected by the oil temperature sensor 22 or the coolant temperature of the engine detected by the coolant temperature sensor 23 as the temperature in the engine compartment. The engine temperature acquirer 114 may predict the temperature in the engine compartment on the basis of the engine rotation speed acquired from the engine rotation sensor 24.

The displacement amount calculator 115 calculates a displacement amount (shift amount) of the optical axis of the headlamp unit 13 on the basis of the temperature in the engine compartment acquired by the engine temperature acquirer 114. For example, a formula for calculating the displacement amount according to the temperature in the engine compartment, or a table associating the temperature in the engine compartment and the displacement amount is stored in the ROM 112 or the like in advance. The displacement amount calculator 115 calculates the displacement amount on the basis of this formula or table. In some embodiments, the formula or the table is acquired in advance for each vehicle by simulation or the like.

The speed information acquirer 116 acquires speed information including the travel speed detected by the vehicle speed sensor 25 and the travel time at the travel speed. The vehicle is subject to a stream of air due to traveling, and thus the area around the headlamp unit 13 may also be cooled by the stream of air from the vehicle exterior. Because of this, the degree of cooling differs depending on the travel speed and the travel time of the vehicle, and thus the speed information acquirer 116 acquires the speed information. Further, the effect of the stream of air differs depending on the outside temperature as well, changing the degree of cooling of the headlamp unit 13. Therefore, in some embodiments, the outside temperature is acquired from the outside temperature sensor 52.

The optical axis adjuster 117 determines the adjustment amount of the headlamp unit 13 on the basis of the displacement amount calculated by the displacement amount calculator 115 and outputs a drive signal indicating the adjustment amount to the driver 12.

Further, in a case where the speed information acquirer 116 has acquired the speed information, the optical axis adjuster 117 corrects, on the basis of the speed information, the displacement amount calculated by the displacement amount calculator 115. The optical axis adjuster 117 then determines the adjustment amount of the headlamp unit 13 according to the corrected displacement amount, and outputs a drive signal indicating the adjustment amount to the driver 12.

Further, in a case where the travel speed indicated by the speed information is a first speed determined in advance or higher, the optical axis adjuster 117 does not output a drive signal to the driver 12. Thus, the optical axis of the headlamp unit 13 is not adjusted. This is in consideration of the fact that the area surrounding the headlamp unit 13 is sufficiently cooled in a case where the travel speed is the first speed determined in advance or higher, eliminating the need for optical axis adjustment.

Similarly, in a case where the travel speed indicated by the speed information is a second speed determined in advance or higher and the vehicle has traveled at this second speed for a predetermined time or longer, the optical axis adjuster 117 does not output a drive signal to the driver 12. Thus, the optical axis of the headlamp unit 13 is not adjusted. This is in consideration of the fact that, in a case where the vehicle has traveled at the second speed determined in advance for the predetermined time, the area around the headlamp unit 13 is sufficiently cooled, eliminating the need for optical axis adjustment. Accordingly, in some embodiments, the first speed, the second speed, and, as the predetermined time, a period over which the area around the headlamp unit 13 is sufficiently cooled are determined in advance.

Headlamp Unit

Next, the headlamp unit 13 subject to optical axis adjustment by the optical axis adjustment ECU 11 will now be described with reference to FIG. 3 to FIG. 5.

Figure 3:
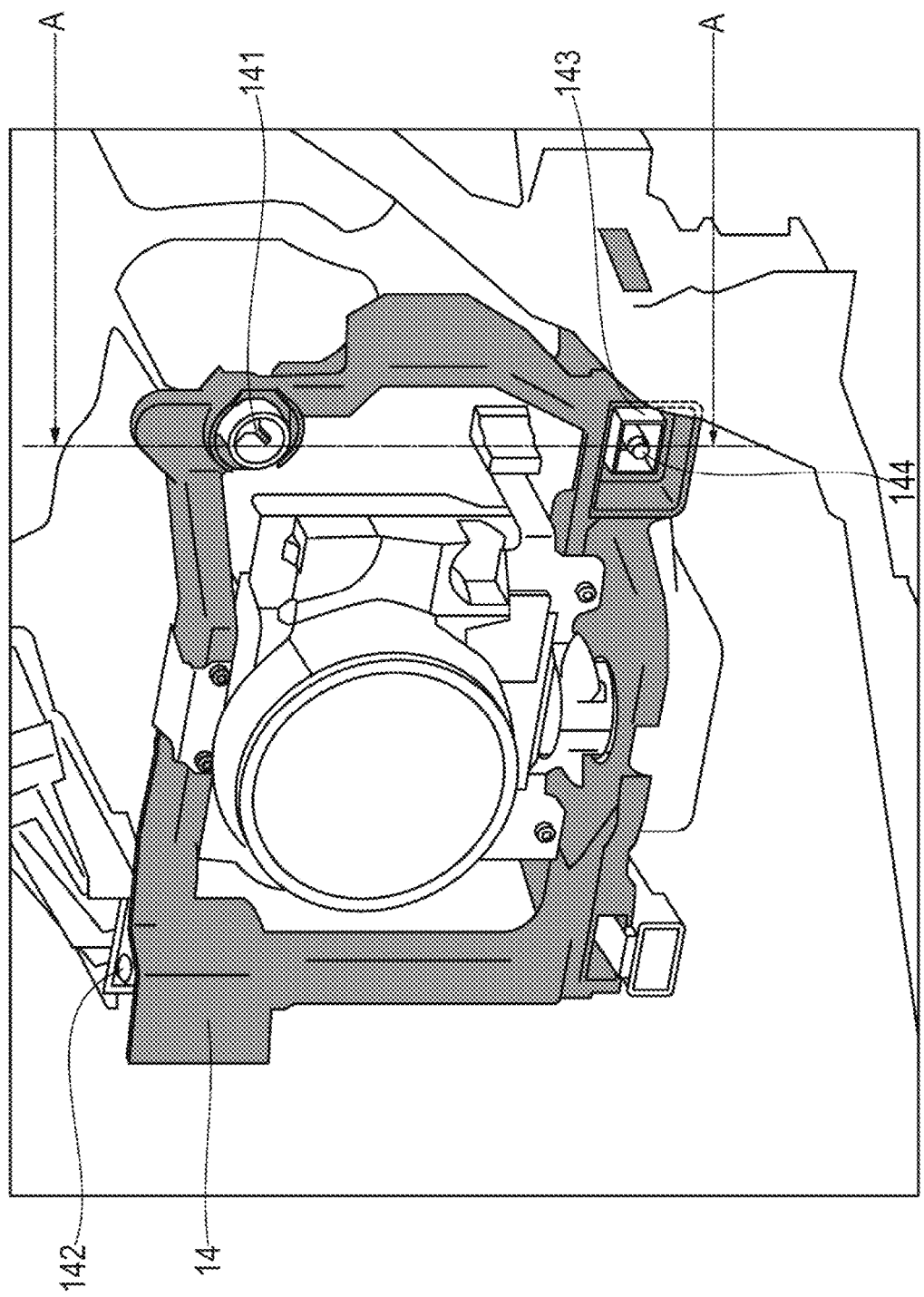
FIG. 3 illustrates a schematic configuration of a headlamp unit for a vehicle, the headlamp unit having an optical axis to be adjusted by the optical axis adjustment device according to the embodiment of the disclosure.
Figure 4:
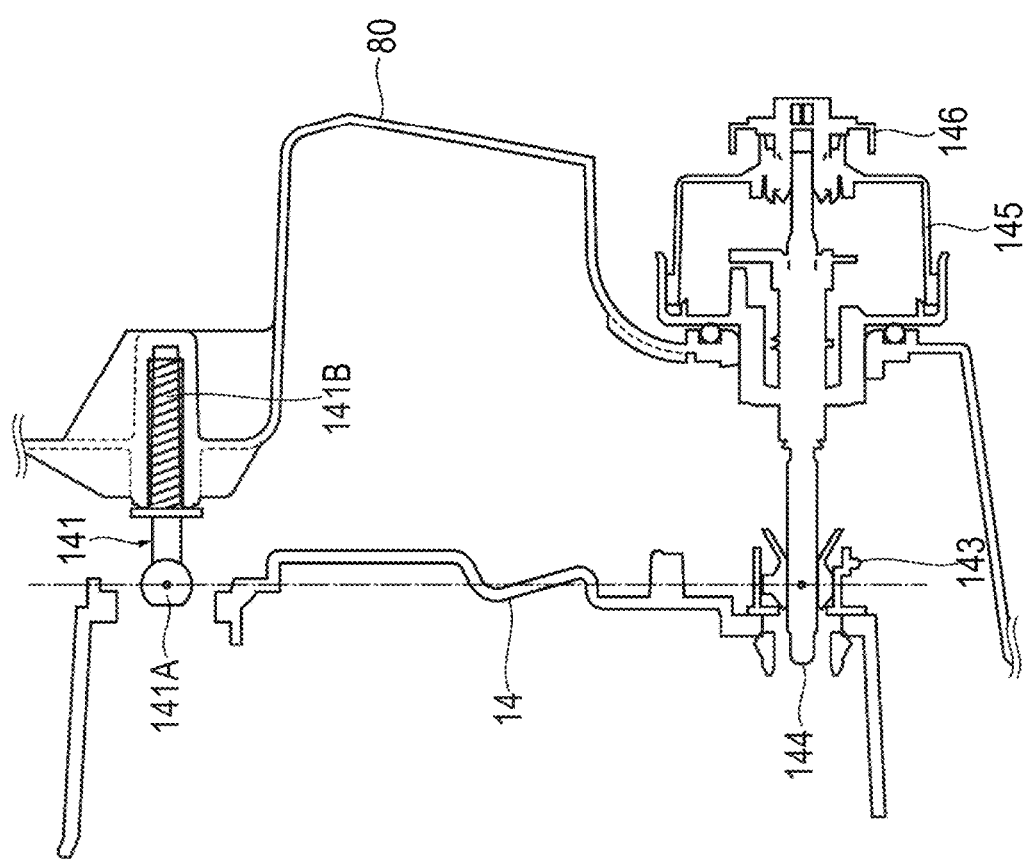
FIG. 4 illustrates a cross section taken along A-A in FIG. 3.
Figure 5:
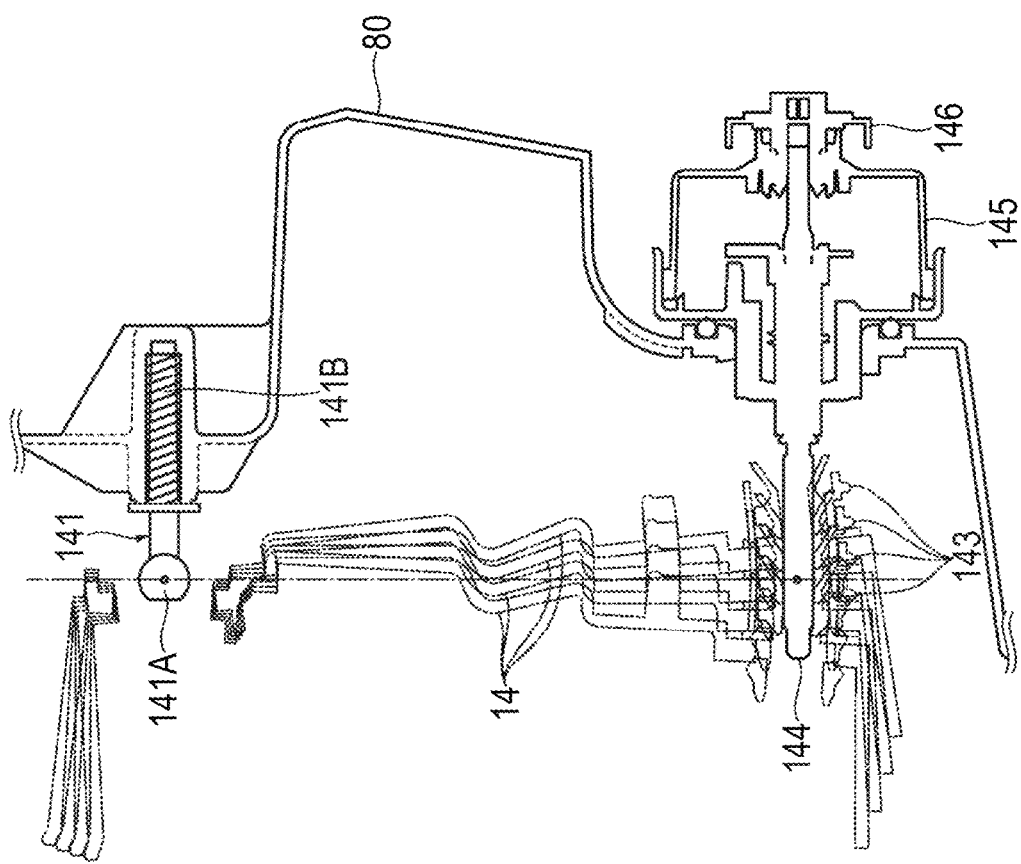
FIG. 5 illustrates the cross section taken along A-A in FIG. 3 and movement of a bracket supporting the headlamp unit.

Headlamp units 13 are typically provided as a pair on a left side and a right side of the front portion of the vehicle, but one headlamp unit 13 is illustrated as a representative example in FIG. 3 to FIG. 5. As illustrated in FIG. 3 to FIG. 5, the headlamp unit 13 includes a light source (not illustrated), a reflector, and a lens in a housing, for example. The reflector directs light emitted from the light source to an area in front of the vehicle, and the lens distributes the light emitted from the light source across a predetermined range.

The headlamp unit 13 is fixed to a bracket 14 and attached to a vehicle body 80 via the bracket 14. The bracket 14 is attached to the vehicle body 80 by a ball joint 141 and a horizontal adjustment aiming screw 142 provided in an upper area of the bracket 14. Further, the bracket 14 is attached to the vehicle body 80 by a vertical adjustment aiming screw 144 provided in a lower area of the bracket 14 with a retainer 143 interposed therebetween.

The ball joint 141 is attached to the bracket 14 so that a ball 141A at one end serves as a swing center (fulcrum) of the bracket 14, and a screw thread 141B at the other end is attached to the vehicle body 80.

The vertical adjustment aiming screw 144 is attached at one end to the bracket 14 with the retainer 143 interposed therebetween and at the other end to a vertical aiming adjustment gear 146 of a leveling unit 145 on the vehicle body 80 side.

As the vertical adjustment aiming screw 144 and the retainer 143 move in a vehicle front-rear direction, the headlamp unit 13 is thus vertically tiltably supported together with the bracket 14 with respect to the vehicle body 80. At this time, the ball 141A at the one end of the ball joint 141 serves as the fulcrum.

That is, the vertical adjustment aiming screw 144 is rotated, moving the retainer 143 in the vehicle front-rear direction. Further, as the retainer 143 moves, the lower portion of the bracket 14 also moves in the vehicle front-rear direction. As a result, the headlamp unit 13 rotates about the ball 141A of the ball joint 141 and then tilts.

When the optical axis of the headlamp unit 13 is adjusted, the adjustment can be made manually by an operator or automatically by the optical axis adjustment ECU 11.

In the case where an operator performs manual adjustment and rotates the vertical adjustment aiming screw 144 with a screwdriver, the retainer 143 moves in the vehicle front-rear direction at the screw thread of the vertical adjustment aiming screw 144. As the retainer 143 moves, the lower portion of the bracket 14 also moves in the vehicle front-rear direction. As a result, the headlamp unit 13 rotates together with the bracket 14 about the ball 141A of the ball joint 141 and then tilts.

In the case of automatic adjustment by the optical axis adjustment ECU 11, the driver 12 (motor, for example) included in the leveling unit 145 is driven to rotate the vertical adjustment aiming screw 144 together with the vertical aiming adjustment gear 146. The driver 12 rotates the vertical adjustment aiming screw 144 so that the vertical adjustment aiming screw 144 moves in the vehicle front-rear direction and, as the vertical adjustment aiming screw 144 moves, the retainer 143 also moves in the vehicle front-rear direction. As a result, the headlamp unit 13 rotates together with the bracket 14 about the ball 141A of the ball joint 141 and then tilts.

The optical axis adjustment ECU 11 according to the present embodiment adjusts the optical axis of the headlamp unit 13 thus configured as follows.

The headlamp unit 13, being attached near the engine of the vehicle body 80, is affected by temperature changes in the engine compartment during travel and is thus susceptible to thermal expansion or the like. Therefore, in the optical axis adjustment ECU 11, the engine temperature acquirer 114 acquires the oil temperature of the engine detected by the oil temperature sensor 22 or the coolant temperature of the engine detected by the coolant temperature sensor 23 as the temperature in the engine compartment. The optical axis adjustment ECU 11 then uses this temperature to estimate the temperature around the headlamp unit 13 near the engine.

The displacement amount calculator 115 calculates the displacement amount of the optical axis according to the acquired temperature in the engine compartment from the formula or the like stored in the ROM 112. The displacement amount calculator 115 then outputs the calculated displacement amount to the optical axis adjuster 117.

The speed information acquirer 116 outputs the speed information including the travel speed acquired from the vehicle speed sensor 25 and the time traveled at the travel speed to the optical axis adjuster 117.

The optical axis adjuster 117 calculates the adjustment amount of the headlamp unit 13 on the basis of the displacement amount calculated by the displacement amount calculator 115 and outputs a drive signal indicating the adjustment amount to the driver 12.

Note that, in a case where the speed information exists at this time, the optical axis adjuster 117 calculates the adjustment amount of the headlamp unit 13 based on the displacement amount corrected according to the speed information. The optical axis adjuster 117 then outputs a drive signal indicating the adjustment amount to the driver 12.

Further, in a case where the speed information indicates travel at the first speed determined in advance or higher, travel at the second speed determined in advance or higher for the predetermined time, or the like, the optical axis adjuster 117 does not output a drive signal to the driver 12. Thus, the optical axis is not adjusted.

Note that, the optical axis adjuster 117 may correct the displacement amount on the basis of the outside temperature acquired from the outside temperature sensor 52 or the rainfall amount acquired from the raindrop sensor 62, as necessary.

The driver 12 rotates the vertical adjustment aiming screw 144 on the basis of the drive signal from the optical axis adjuster 117 to move the vertical adjustment aiming screw 144 by the adjustment amount in the front-rear direction relative to the vehicle body 80.

As the vertical adjustment aiming screw 144 moves, the retainer 143 also moves in the front-rear direction of the vehicle body 80 by the adjustment amount calculated by the optical axis adjuster 117. With this movement, the bracket 14 rotates about the ball 141A and then tilts. As a result, the headlamp unit 13 supported by the bracket 14 can vertically tilt with respect to the vehicle body 80, and the position of the optical axis can be adjusted according to the displacement amount of the optical axis calculated by the displacement amount calculator 115.

Thus, according to the present embodiment, the temperature in the engine compartment is estimated and the displacement (shift) of the optical axis of the headlamp unit 13 based on the temperature rise is predicted, taking into account temperature changes due to the stream of air caused by the travel speed of the vehicle. This makes it possible to calculate a shift in the optical axis caused by a temperature change around the vehicle headlamp in advance or in real time and adjust the shift with high precision.

Embodiments of the disclosure have been described in detail with reference to the drawings, but exemplary configurations thereof are not limited to these embodiments. Rather, design variations and the like within a range that does not deviate from the spirit and intent of the disclosure are also included in the disclosure. Moreover, insofar as there are no particular contradictions or problems in purposes, configurations, or the like, the techniques of the various embodiments described above may be used in combination.

Advantageous Effects of Invention

With the optical axis adjustment device of the embodiment of the disclosure, a shift in an optical axis caused by a temperature change around a vehicle headlamp can be calculated and corrected or adjusted with high precision.

The invention claimed is:

1. An optical axis adjustment device for a headlamp unit to be mounted in a vehicle, the optical axis adjustment device being configured to adjust an optical axis of the headlamp unit, the optical axis adjustment device comprising:
   an engine temperature acquirer configured to acquire a temperature in an engine compartment of the vehicle;
   a displacement amount calculator configured to calculate a displacement amount of the optical axis on a basis of the temperature;
   a speed information acquirer configured to acquire speed information including a travel speed and a travel time of the vehicle; and
   an optical axis adjuster configured to adjust the optical axis of the headlamp unit on a basis of the displacement amount and the speed information.

2. The optical axis adjustment device according to claim 1,
   wherein the optical axis adjuster is configured to correct the displacement amount on a basis of the travel speed and the travel time and adjusts the optical axis of the headlamp unit on a basis of the corrected displacement amount.

3. The optical axis adjustment device according to claim 1,
   wherein the optical axis adjuster is configured to perform no adjustment of the optical axis of the headlamp unit in a case where the travel speed is a first speed determined in advance or higher.

4. The optical axis adjustment device according to claim 1,
   wherein the optical axis adjuster is configured to perform no adjustment of the optical axis of the headlamp unit in a case where the vehicle has traveled at a second speed determined in advance or higher for a predetermined time or longer.

5. An optical axis adjustment device for a headlamp unit to be mounted in a vehicle, the optical axis adjustment device being configured to adjust an optical axis of a headlamp unit, the optical axis adjustment device comprising circuitry configured to
   acquire a temperature in an engine compartment of the vehicle,
   calculate a displacement amount of the optical axis on a basis of the acquired temperature,
   acquire speed information including a travel speed and a travel time of the vehicle; and
   adjust the optical axis of the headlamp unit on a basis of the displacement amount and the speed information.

* * * * *